United States Patent [19]
Baba et al.

[11] Patent Number: 6,013,749
[45] Date of Patent: Jan. 11, 2000

[54] LIQUID CURABLE RESIN COMPOSITION

[75] Inventors: Atsushi Baba; Yuichi Eriyama; Takashi Ukachi, all of Ibaraki, Japan

[73] Assignee: DSM N.V., Heerlen, Netherlands

[21] Appl. No.: 09/048,978

[22] Filed: Mar. 27, 1998

[30] Foreign Application Priority Data

Mar. 28, 1997 [JP] Japan ................................. 9-077133

[51] Int. Cl.$^7$ .............................. C08F 30/08; C08F 2/46
[52] U.S. Cl. .............................. 526/279; 522/83; 522/84; 522/91; 522/99; 528/32; 528/41
[58] Field of Search ................................. 522/83, 84, 91, 522/99; 528/32, 41; 526/279

[56] References Cited

U.S. PATENT DOCUMENTS

| | | | |
|---|---|---|---|
| 4,626,560 | 12/1986 | Marsden et al. | 523/145 |
| 4,889,768 | 12/1989 | Yokoshima et al. | 428/429 |
| 5,166,383 | 11/1992 | Parrinello et al. | 556/414 |
| 5,378,734 | 1/1995 | Inoue | 522/11 |
| 5,378,735 | 1/1995 | Hosokawa et al. | 522/79 |

FOREIGN PATENT DOCUMENTS

| | | |
|---|---|---|
| 0 406 160 A2 | 6/1990 | European Pat. Off. . |
| 5-72723 | 3/1993 | Japan . |

*Primary Examiner*—James J. Seidleck
*Assistant Examiner*—Sanza L. McClendon

*Attorney, Agent, or Firm*—Pillsbury Madison & Sutro Intellectual Property Group

[57] ABSTRACT

A liquid curable resin composition containing:

(A) a polyfunctional (meth)acrylic compound having at least three (meth)acryloyl groups in a molecule;

(B) a reaction product obtained by the reacting (i) an alkoxysilane compound having a polymerizable unsaturated group, a urethane bonding group and an organic group represented by the formula (1),

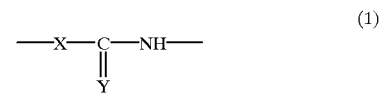

and (ii) silica particles;

(C) a silicone polymer; and (D) an irradiation sensitive initiator.

The composition when coated on surfaces of plastic molded articles and other materials provides for superior slip characteristics and resistance to abrasions, stains, weather, solvents and alkali environments. The composition of the instant invention is particularly suitable as a hard coat material for plastic optical components, touch panels, film-type liquid crystal elements, molded plastic articles or as a stain-proof or scratch-proof coating for wall and flooring materials which are used as architectural interior finishings.

13 Claims, No Drawings

LIQUID CURABLE RESIN COMPOSITION

BACKGROUND OF THE INVENTION

1. Field of the Invention

The present invention relates to a liquid curable resin composition and, more particularly, to a liquid curable resin composition capable of forming cured coatings or molded articles, having excellent slip characteristics and superior surface resistance to abrasions, stains, weather, solvents and alkali environments. The liquid curable resin composition is suitable for use as a hard coating material for plastic optical parts, touch panels, film-type liquid crystal elements, molded plastic articles, or as a stainless or scratch-proof coating material used for wall and flooring materials which are used as architectural interior finishings.

2. Description of the Background Art

Conventionally, a hard coat treatment has been applied for protection to the surfaces of molded plastic articles such as optical components, touch panels, film-type liquid crystal elements, molded plastic articles, or to the surfaces of wall and flooring materials used as architectural interior finishings. Suitable compounds useful as hard coat materials include UV curable acrylic compounds such as polyester acrylates, urethane acrylates, or epoxy acrylates. However, properties such as scratch and stain resistance and slip characteristics, are not improved when only these resins are used.

Methods for improving scratch and stain resistance and slip characteristics include adding inorganic fillers such as silica; adding organic fillers such as polyethylene or polycarbonate powders; and adding additives such as silicone, are well known in the art. The addition of inorganic or organic fillers, however, has drawbacks such as increases in the haze value of resulting coating films and/or impaired physical appearance. While slip characteristics of the coating surface can be improved by the addition of silicone or the like, silicone addition is unable to improve scratch resistance due to abrasive wheels. Additionally, commonly used silicone additives may be hydrolyzed by an alkali during post-treatment of alkali etching which is applied to touch panel hard coats or the like. This results in impaired physical appearance and peeling of the coating film from plastic molded articles.

An object of the present invention is therefore to provide a composition for coating a hard coat with excellent slip characteristics and superior surface resistance to abrasions, stains, weather, solvent and alkali environments.

SUMMARY OF THE INVENTION

This object of the present invention can be achieved by a liquid curable resin composition comprising:

(A) a polyfunctional (meth)acrylic compound (hereinafter referred to as "component A"), having at least three (meth)acryloyl groups in a molecule (B) a reaction product (hereinafter referred to as "component B"), obtained by the reaction of (i) an alkoxysilane compound having a polymerizable unsaturated group, a urethane bonding group and an organic group represented by the following formula (1),

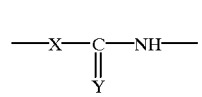

wherein X represents —NH—, —O—, or —S—, Y is an oxygen atom or a sulfur atom, provided that when X is —O—, Y is a sulfur atom, and (ii) silica particles (C) a silicone polymer (hereinafter referred to as "component C") and (D) an irradiation sensitive initiator (hereinafter referred to as "component D").

DETAILED DESCRIPTION OF THE INVENTION AND PREFERRED EMBODIMENTS

Component A

Component A is a polyfunctional (meth)acrylic compound having at least three (meth)acryloyl groups in a molecule. Component A generally has less than 12 (meth) acryloyl groups, preferably less than 8. The molecular weight of component A is not critical, and will be in general less than 1000.

Examples of compounds that can be used as component A include trimethylolpropane tri(meth)acrylate, trimethylolpropane trioxyethyl (meth)acrylate, tris(2-hydroxyethyl) isocyanurate tri(meth)acrylate, pentaerythritol tri(meth) acrylate, pentaerythritol tetra(meth)acrylate and dipentaerythritol hexa(meth)acrylate.

In addition, commercially available products of the polyfunctional (meth)acrylic compound having at least three (meth)acryloyl groups in a molecule include KAYARAD DPHA, DPCA-20, DPCA-30, DPCA-60, DPCA-120, D-310, D-330, PET-30, GPO-303, TMPTA, THE-330, TPA-330 (manufactured by Nippon Kayaku Co., Ltd.), Aronix M-315, M-325 (manufactured by Toagosei Co., Ltd.) and the like.

Component B

Generally, component B of the present invention is prepared by a process which comprises mixing an alkoxysilane compound and silica particles. More particularly, component B is prepared by reacting (i) an alkoxysilane compound having a polymerizable unsaturated group, a urethane bonding group represented by the formula —NH(C=O)— and an organic group represented by the above formula (1) and (ii) silica particles.

The amount of the alkoxysilane compound residue immobilized on silica particles is 0.01 wt. % or more, preferably 0.1 wt. % or more, and particularly preferably 1 wt. % or more. Weight percent (wt. %) is determined relative to the amount of silica particles. If the amount of alkoxysilane compound residue immobilized on the silica particles is less than 0.01 wt. %, the silica particles and colloidal silica in the composition may exhibit inadequate dispersibility, transparency and abrasion resistance. The amount of the alkoxysilane compound in the raw material for preparing the component B is 10 wt. % or more, and particularly preferably 30 wt. % or more. If this amount of alkoxysilane compound is less than 10 wt. %, the composition of the present invention may have poor film forming capability. In addition, the proportion of silica particles in the raw material composition for preparing the component B is preferably 50 wt. % or less, and particularly preferably 20 wt. % or less. If this proportion is more than 50 wt. %, the resulting resin composition of the present invention may have poor dispersibility, transparency, or abrasion resistance.

The alkoxysilane compound contains at least one polymerizable unsaturated group, urethane bond group, organic group represented by the above-described formula (1) and an alkoxysilyl group. The alkoxysilyl group is a component which bonds to the silanol group produced on the surface of silica particles by a hydrolysis or condensation reaction. The polymerizable unsaturated group is a component chemically crosslinkable with the molecules through addition polymerization in the presence of an activated radical. The above-mentioned —X(C=Y)NH— group and the urethane bonding group which are divalent organic groups represented by the formula (1) connect the part of the molecule having the alkoxysilyl group and the part of the molecule having the polymerizable unsaturated group directly or indirectly via other groups. At the same time, these organic groups generate a moderate agglomeration force due to hydrogen bonding among molecules, thereby providing the cured products produced from the composition of the present invention with dynamic strength, excellent adhesion to a substrate and superior heat resistance. An —S(C=O)NH— group is desirable as the —X(C=Y)NH— group.

Examples of alkoxysilane compounds include compounds shown by the general formula (2):

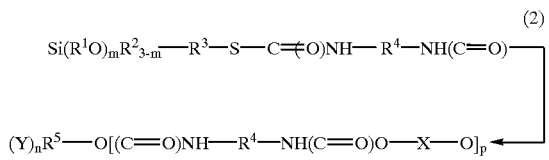

(2)

In the formula (2), $R^1$ is a hydrogen atom or a monovalent organic group having 1–8 carbon atoms such as methyl, ethyl, propyl, butyl, phenyl, or octyl group; $R^2$ is a hydrogen atom or a monovalent alkyl group having 1–3 carbon atoms; and m is 1, 2, or 3; $R^3$ is a divalent organic group having 1–3 carbon atoms; $R^4$ is a divalent organic group having a molecular weight of 14–10,000, preferably 78–1000, such as linear alkylene groups, divalent alicyclic or polycyclic organic groups and divalent aromatic groups; X is a divalent organic group preferably obtained from an addition reaction between a compound having at least two active hydrogen atoms and an isocyanate group; $R^5$ is an organic group with a valence of (n+1), which is selected from linear, branched, or cyclic saturated hydrocarbon groups, unsaturated hydrocarbon groups and alicyclic groups; Y is a monovalent organic group having a polymerizable unsaturated group capable of binding molecules by cross-linking reaction in the presence of active radicals; n is an integer from 1 to 20, preferably 1–10 and more preferably 3–5; and p is 0 or 1, and Y is an organic group having a polymerizable unsaturated bond.

Examples of the divalent linear alkylene groups represented by $R^4$ include: methylene, ethylene, propylene, hexamethylene, octamethylene and dodecamethylene. Examples of divalent alicyclic or polycyclic groups represented by $R^4$ include cyclohexylene and norbornylene. Examples of divalent aromatic group represented by $R^4$ include vinylene phenylene, naphthylene, biphenylene and polyphenylene. The divalent groups represented by $R^4$ may be substituted by alkyl groups or aryl groups and may contain an atomic group containing elements other than carbon and hydrogen atoms.

The divalent organic groups represented by X can be obtained by removing two active hydrogen atoms from a polyalkylene glycol, polyalkylene thioglycol, polyester, polyamide, polycarbonate, polyalkylene diamine, polyalkylene dicarboxylic acid, polyalkylene diol, or polyalkylene dimercaptan.

Examples of the monovalent organic group, represented by Y, having a polymerizable unsaturated group capable of binding molecules by cross-linking bond in the presence of active radicals include, acryloxy group, methacryloxy group, vinyl group, propenyl group, butadienyl group, styryl group, ethynyl group, cinnamoyl group, maleate group and acrylamide group, with the acryloxy group being particularly desirable.

Examples of alkoxysilyl groups represented by $Si(R^1O)_m R^2_{3-m}$ include trimethoxysilyl, triethoxysilyl, triphenoxysilyl, methyldimethoxysilyl, dimethylmethoxysilyl and the like. Among these, particularly preferred groups are trimethoxysilyl and triethoxysilyl. The structural component represented by the formula —[(C=O)NH—$R^4$—NH(C=O)O—X—O]$_p$— is introduced to extend the molecular chain.

The alkoxysilane compound can be obtained from an addition reaction of an alkoxysilane compound possessing a mercapto group, (i.e. mercapto alkoxysilane), a polyisocyanate compound and a polymerizable unsaturated compound possessing an active hydrogen group which reacts with isocyanate group through the addition reaction.

The following processes are examples for preparing alkoxysilane compounds.

Process (A)

A process comprising (i) subjecting a mercapto alkoxysilane and a polyisocyanate to an addition reaction in order to produce an intermediate compound containing an alkoxysilyl group, an —S(C=O)NH— group and an isocyanate group and (ii) binding this intermediate compound to a polymerizable unsaturated compound containing a hydrogen group exhibiting an activity to the remaining isocyanate group via a urethane group.

Process (B)

A process comprising (i) subjecting a polyisocyanate and a polymerizable unsaturated compound with an active hydrogen-containing group to an addition reaction in order to produce an intermediate compound containing a polymerizable unsaturated group, a urethane binding group and an isocyanate group, and (ii) reacting this intermediate compound with mercapto alkoxysilane to bind the two compounds via —S(C=O)NH— group.

In the above processes (A) or (B), the molecular chain may be extended by causing the polyisocyanate compound to react with a linear, cyclic, or branched compound containing at least two active hydrogens reactive with isocyanate by the addition reaction in a molecule via the urethane bond.

The alkoxysilane which can form the —S(C=O)NH— bond by directly reacting with the polyisocyanate compound in manufacture of the compound of the foregoing formula (2) can be selected from compounds possessing at least one alkoxysilyl group and at least one mercapto group in the molecule.

Examples of such alkoxysilanes are mercapto alkoxysilanes such as mercaptopropyl-trimethoxysilane, mercaptopropyltriethoxysilane, mercaptopropylmethyldiethoxysilane, mercaptopropyldimethoxymethylsilane, mercaptopropylmethoxydimethylsilane, mercaptopropyltriethoxysilane, mercaptopropyltriphenoxysilane and mercaptopropyltributoxysilane. Among these, particularly preferred are mercaptopropyltrimethoxysilane and mercaptopropyltriethoxysilane. An example of commercially available mercaptoalkoxysilanes is SH6062 manufactured by Toray-Dow Corning Co., Ltd. These mercaptoalkoxysilanes may be used either individually or in combinations of two or more. Examples of mercaptoalkoxysilanes include an addition compound of amino substituted alkoxysilane and epoxy group-substituted mercaptan, an addition compound of epoxy silane and α,ω-dimercapto compound and the like.

The polyisocyanate compound used for preparing the alkoxysilane compound is selected from polyisocyanate compounds formed from a linear saturated hydrocarbon, a cyclic saturated hydrocarbon, or an aromatic hydrocarbon. These polyisocyanate compounds may be used either individually or in combinations of two or more. The number of isocyanate groups in one molecule is usually 2 or more and less than 30, preferably 2 or more and less than 10. If more than 30, the resulting product has a high viscosity which may make handling the products difficult.

Examples of suitable polyisocyanate compounds include linear hydrocarbon polyisocyanate compounds such as tetramethylene diisocyanate, hexamethylene diisocyanate and 2,2,4-trimethylhexamethylene diisocyanate; saturated cyclic hydrocarbon polyisocyanate compounds such as isophorone diisocyanate, dicyclohexylmethane diisocyanate, methylene bis(4-cyclohexylisocyanate), hydrogenated diphenylmethane-diisocyanate, hydrogenated xylene diisocyanate, hydrogenated toluene diisocyanate and 1,3-bis (isocyanatemethyl)cyclohexane; and aromatic hydrocarbon polyisocyanate compounds such as 2,4-tolylene diisocyanate, 2,6-tolylene diisocyanate, 1,3-xylylene diisocyanate, 1,4-xylylene diisocyanate, p-phenylene diisocyanate, 3,3'-dimethyl-4,4'-diphenylmethane diisocyanate, diphenylmethane-4,4'-diisocyanate, 4,4'-biphenylene diisocyanate, 6-isopropyl-1,3-phenyl diisocyanate, 4-diphenylpropane diisocyanate, lysine diisocyanate, 1,5-naphthalene diisocyanate and polyisocyanate of polydiphenylmethane.

Among these, saturated cyclic hydrocarbon polyisocyanate compounds and aromatic hydrocarbon polyisocyanate compound, particularly polyisocyanate compounds of saturated cyclic hydrocarbon are preferred. Particularly preferred polyisocyanates are isophorone diisocyanate, hydrogenated xylene diisocyanate and hydrogenated toluene diisocyanate. Examples of commercially available polyisocyanate compounds are TDI-80/20, TDI-100, MDI-CR100, MDI-CR300, MDI-PH and NDI manufactured by Mitsui-Nisso Urethane Co., Ltd., Coronate T, Millionate MT, Millionate MR and HDI manufactured by Nippon Polyurethane Kogyo Co., Ltd. and Takenate 600 manufactured by Takeda Chemical Industries, Ltd.

The amount of polyisocyanate compounds (in terms of isocyanate group equivalents) present in process (A) above is in the range from 0.1 to 100, preferably from 0.5 to 10, and more preferably from 0.9 to 1.2, for one equivalent of the mercapto group in mercaptoalkoxysilane compounds. If this amount of polyisocyanate compound is less than 0.1 equivalent in terms of isocyanate group, more than 0.9 equivalent of unreacted mercaptosilane is present in the resulting alkoxysilane compound. This may result in inadequate abrasive properties in the coating film produced from the composition. The amount of polyisocyanate compound in excess of 100 equivalent in terms of isocyanate group, on the other hand, allows presence of a large amount of unreacted isocyanate group, which may impair weather resistance of the resulting coating films. The amount of polyisocyanate compound present in process (B) is usually in the range from 0.1 of 100, preferably 0.5 to 10, and more preferably from 0.9 to 1.2, as isocyanate group equivalent for one equivalent of active hydrogen group in the active hydrogen group-containing polymerizable unsaturated compound.

In either of these processes (A) or (B), a catalyst may be added to reduce the reaction time. A basic catalyst or an acidic catalyst can be used. Examples of basic catalysts include amines such as pyridine, pyrrole, triethylamine, diethylamine, dibutylamine and ammonia and phosphines such as tributylphosphine and triphenylphosphine. Of these, tertiary amines such as pyridine and triethylamine are particularly desirable. Examples of acidic catalysts include copper naphthenate, cobalt naphthenate, zinc naphthenate, 1,4-diazabicyclo-[2.2.2]octane (DABCO), methyl DABCO, metal alkoxides such as tributoxy aluminum, trititaniumtetrabutoxide, zirconiumtetrabutoxide; Lewis acids such as trifluoroboron diethyletherate and aluminium chloride; tin compounds such as tin 2-ethylhexanoate, octyl tin trilaurate, dibutyl tin dilaurate and octyl tin diacetate. Of these, acidic catalysts, particularly tin compounds, are preferred. Octyl tin trilaurate, dibutyl tin dilaurate and octyl tin diacetate are particularly preferred.

The amount of catalysts used in the reaction is from 0.01 to 5 parts by weight, preferably from 0.1 to 1 part by weight, for 100 parts by weight of polyisocyanate compound. If less than 0.01 parts by weight, the effect of reducing the reaction time by the addition of catalyst is insufficient; the amount exceeding 5 parts by weight, on the other hand, may impair storage stability of the resulting product.

Examples of polymerizable unsaturated compounds which can bond with urethane bond to the polyisocyanate compound by the addition reaction include compounds containing at least one active hydrogen atom which can form a urethane bond with isocyanate group by the addition reaction and at least one polymerizable unsaturated group in the molecule. These compounds may be used either individually or in combinations of two or more.

Carboxylic acid-containing polymerizable unsaturated compounds and hydroxyl group-containing polymerizable unsaturated compounds are given as such compounds. Specific examples of the carboxylic acid-containing polymerizable unsaturated compound include unsaturated aliphatic carboxylic acids, such as (meth)acrylic acid, itaconic acid, cinnamic acid, maleic acid, fumaric acid, 2-(meth) acryloxypropyl-hexahydrogen phthalate and 2-(meth) acryloxyethyl-hexahydrogen phthalate; and unsaturated aromatic carboxylic acids, such as 2-(meth)acryloxypropyl phthalate, 2-(meth)acryloxypropylethyl phthalate. Examples of the hydroxyl group-containing polymerizable unsaturated compounds include hydroxyl group containing-acrylates, hydroxyl group containing-methacrylates and hydroxyl group-containing styrenes, such as 2-hydroxyethyl (meth) acrylate, 2-hydroxypropyl (meth)acrylate, 2-hydroxy butyl (meth)acrylate, 2-hydroxy-3-phenyloxypropyl (meth) acrylate, 1,4-butanediol mono(meth)acrylate, 2-hydroxyalkyl (meth)acryloyl phosphate, 4-hydroxycyclohexyl (meth)acrylate, neopentyl glycol mono(meth)acrylate, polyethylene (pentamethyleneoxy-carboxylate)ethoxy (meth)acrylate, hydroxy styrene, hydroxy-α-methylstyrene, hydroxyethyl styrene, hydroxy terminal polyethylene glycol styryl ether, hydroxy terminal polypropylene glycol styryl ether, hydroxy terminal polytetramethylene glycol styryl ether, terminal hydroxy polyethylene glycol (meth)acrylate, terminal hydroxy polypropylene glycol (meth)acrylate, terminal hydroxy polyethylene tetraethylene glycol (meth)acrylate, trimethylolpropane di(meth)acrylate, trimethylolpropane mono (meth)acrylate, EO-modified trimethylolpropane tri(meth) acrylate, PO-modified trimethylolpropane tri(meth)acrylate, pentaerythritol tri(meth)acrylate, pentaerythritol di(meth) acrylate, pentaerythritol mono(meth)acrylate, dipentaerythritol penta(meth)acrylate, dipentaerythritol tetra(meth) acrylate, dipentaerythritol tri(meth)acrylate, dipentaerythritol di(meth)acrylate and dipentaerythritol mono(meth)acrylate.

Among these, unsaturated aliphatic carboxylic acids and hydroxyl group-containing acrylate compounds are preferred, and particularly preferred are hydroxyl group-containing acrylate compounds, for example, 2-hydroxylethyl acrylate, 2-hydroxypropyl acrylate, pentaerythritoltriacylate, trimethylolpropane diacrylate and dipentaerythritol pentacrylate.

The amount of these polymerizable unsaturated compounds used, in terms of the active hydrogen group equivalent, is usually one equivalent or more for one equivalent of the remaining isocyanate group in the intermediate obtained by the addition reaction of mercaptoalkoxysilane and polyisocyanate compound. If less than one equivalent, the resulting product may exhibit undesirable properties such as foaming, an increase in viscosity, or coloration due to a reaction with moisture and the residual active isocyanate groups in the alkoxysilyl compound.

In the manufacture of alkoxysilyl compounds a divalent organic group may be introduced between the polymerizable unsaturated group and the alkoxysilyl group produced by the addition reaction with polyisocyanate compound to improve flexibility of coating film and adhesion properties to substrates. As a precursor for such a divalent organic compound, linear, cyclic and branched organic compounds having at least two active hydrogens which react with an isocyanate group by the addition reaction in the molecule can be used. Examples of groups containing an active hydrogen include hydroxyl, carboxyl, mercapto, amino, silanol, sulfonic acid and phosphoric acid groups. These organic compounds possess two or more active hydrogens, preferably two or more but less than 10, particularly preferably two, active hydrogens. The molecular weight of the compound having such active hydrogens is usually 50–100,000, preferably 100–50,000, and particularly preferably 500–10,000. Examples of suitable divalent organic compounds are polyalkylene glycols, polyalkylene thioglycols, polyester diols, polyamides, polycarbonate diols, polyalkylene diamines, polyalkylene dicarboxylic acids, polyalkylene diols and polyalkylene dimercaptans. Polyalkylene glycols are particularly desirable among these. Examples of commercially available polyalkylene glycols include polyethylene glycol, polypropylene glycol, polytetraethylene glycol, polyhexamethylene glycol and copolymers of two or more of these polyalkylene glycols, such as UNISAFE DC1100, UNISAFE DC1800, UNISAFE DCB1100, UNISAFE DCB1800 (manufactured by Nippon Oil and Fats Co., Ltd.), PPTG4000, PPTG2000, PPTG1000, PTG2000, PTG3000, PTG650, PTGL2000, PTGL1000 (manufactured by Hodogaya Chemical Co., Ltd.), EXENOL1020 (manufactured by Asahi Glass Co., Ltd.), PBG3000, PBG2000, PBG1000 and Z3001 (manufactured by Daiichi Kogyo Seiyaku Co., Ltd.).

The preparation of an alkoxysilane containing the polymerizable unsaturated group which includes the above-mentioned divalent organic group as a structural component is described in processes (C) and (D) below, which use a polyalkylene glycol as a reactant of the process.

Process (C):

Polyalkylene glycol is reacted with a compound having a terminal isocyanate group, obtained from an addition reaction of mercaptoalkoxysilane and polyisocyanate, thereby converting one of the terminals into an alkoxysilane compound of which one of the terminals is a hydroxy group. This alkoxysilane compound is then reacted with compound obtained from an addition reaction between a polymerizable unsaturated compound having a hydroxyl group at the terminal and a polyisocyanate compound, thereby forming a urethane bond between the two compounds.

Process (D):

A compound having a terminal isocyanate group which is obtained from an addition reaction between a mercaptoalkoxysilane and polyisocyanate, is reacted with a compound separately prepared by an addition reaction of a polyalkylene glycol polyisocyanate compound having an active terminal hydroxyl group and a hydroxyl group-containing polymerizable unsaturated compound, thereby forming a urethane bond between the two compounds.

The conditions for producing a urethane bond in the processes (C) and (D) are the same as in the processes (A) and (B) described above. The ratio of equivalence of the compound having a terminal hydroxyl group to the compound having an active terminal isocyanate group taking part in the bond is usually in the range from 1.0 to 1.2. If this ratio is less than 1.0, coloration and viscosity increases tend to occur, due to the presence unreacted isocyanate groups.

Moreover, hydrolyzates with other organic alkoxysilanes may be used in the manufacture of alkoxysilane compounds as the hydrolyzate of the alkoxysilane compound modified with polymerizable unsaturated group. Examples of other organic alkoxysilanes include, condensation products with an alkylalkoxysilane such as tetramethoxy silane, tetraethoxy silane, tetrabutoxy silane, methyl trimethoxysilane, methyl triethoxysilane, dimethyl dimethoxysilane and phenyl trimethoxysilane.

The amount of water used for hydrolysis when the hydrolyzates are prepared is usually from 0.5 to 1.5 equivalent to the total alkoxy group. The hydrolysis is carried out by stirring the mixture at a temperature from 00C to the boiling point of the components for 5 minutes to 24 hours in the presence or absence of a solvent, thereby obtaining a condensate polymer. In this instance, an acidic catalyst or a basic catalyst may be used for the purpose of shortening the reaction time.

The silica particles used for the manufacture of component B are powdery or colloidal silica with an average particle diameter from 0.001 $\mu$m to 20 $\mu$m. For producing a transparent film a desirable particle diameter is from 0.01 $\mu$m to 2 $\mu$m, particularly preferably from 0.01 $\mu$m to 0.05 $\mu$m. The silica particles may take any form. For example, the particles may be spherical, hollow, porous, rod-like, plate-like, fibrous, or amorphous and preferably spherical. The specific surface area of the silica particles is from 0.1 to 3000 $m^2/g$, and preferably from 10 to 1500 $m^2/g$. These silica particles can be used in the form of dry powder or dispersed in water or an organic solvent. A dispersion of fine silica particles commercially available as colloidal silica can be used as is. The use of colloidal silica is desirable when transparency of the products is desired. When the dispersion solvent for colloidal silica is water, the pH should be from 2 to 10, and preferably on the acid side of from 3 to 7. When the dispersion solvent of colloidal silica is an organic solvent, such an organic solvent preferably is selected from the group consisting of methanol, isopropanol, ethylene glycol, butanol, ethylene glycol monopropyl ether, methyl ethyl ketone, methyl isobutyl ketone, toluene, xylene and dimethyl formamide. These organic solvents may be used in combination with other solvents which are mutually soluble with these solvents or water. Particularly preferred dispersion solvents are methanol, isopropyl alcohol, methyl ethyl ketone and xylene. Given as examples of commercially available products of silica particles are colloidal silica such as methanol silica sols, e.g. IPA-ST, MEK-ST, NBA-ST, XBA-ST, DMAC-ST and ST-UP, ST-OUP, ST-20, ST-40, ST-C, ST-N, ST-O, ST-50, ST-OL manufactured by Nissan Chemical Co., Ltd., silica powders such as AEROSIL 130, AEROSIL 300, AEROSIL 380, AEROSIL TT600, AEROSIL OX50 (manufactured by Japan Aerosil Co., Ltd.), Sildex H31, H32, H51, H52, H121, H122 (manufactured by Asahi Glass Co., Ltd.), E220A, E220 (manufactured by Nippon Silica Industries Co., Ltd.), Silicia 470 (manufactured by Fuji Silicia Chemical Co., Ltd.) and SG Flake (manufactured by Nippon Sheet Glass Co., Ltd.).

The alkoxysilane compound immobilized on the component B can usually be measured as a constant value of weight reduction (%) when dry powder is completely combusted in air, for example, by the thermogravimetric analysis from room temperature to 800° C. in the air.

The amount of water consumed by the hydrolysis of alkoxysilane compound in the preparation of the component B may be the amount required to hydrolyze at least one alkoxy group on a silicon in one molecule. The amount of water which should be present or added during the hydrolysis is preferably ⅓ or more, particularly preferably ½ or more, but less than 3 times the number of mols of the total alkoxy group on silicon. The product obtained by mixing the alkoxysilane compound of the above formula (2) and silica particles under the conditions where no moisture is present at all has a structure with the alkoxysilane compound physically adsorbed on the surface of silica particles. The composition produced from a product with such a structure exhibits only insufficient abrasion resistance, of which the improvement is one of the objectives in the composition of the present invention.

The preparation of component (B) may be selected from one of the following processes: (i) hydrolyzing the alkoxysilane compound of formula (2) above, mixing the hydrolyzate with powdery silica or colloidal silica and heating the mixture while stirring; (ii) carrying out the hydrolysis of the alkoxysilane compound of the formula (2) in the presence of silica particles; and (iii) treating the surface of silica particles in the presence of other components, such as a polyfunctional unsaturated organic compound or a monovalent unsaturated organic compound of an irradiation active initiator. Among these, the process carrying out the hydrolysis of the alkoxysilane compound of the formula (2) in the presence of silica particles is preferred. The preparation of component B is usually carried out at a temperature from 20° C. to 150° C. for 5 minutes to 24 hours.

Silica particles are known to contain moisture on the surface of the particles as adsorption water under normal storage conditions. Colloidal silica product dispersed in an organic solvent, for example, usually contains about 0.5% of water. Accordingly, in the manufacture of component B it is possible to utilize the water contained in the raw materials by mixing and stirring the alkoxysilane compound and silica particles while heating.

When silica powder is used for manufacturing component B, an organic solvent mutually soluble with water may be added to smoothly carry out a uniform reaction of the silica powder and alkoxysilane compound. Alcohols, ketones, ethers and amides are examples of suitable organic solvents. Specific examples of alcohols are methanol, ethanol, isopropyl alcohol, butanol, ethylene glycol monomethyl ether, ethylene glycol monobutyl ether. Examples of suitable ketones are acetone, methyl ethyl ketone and methyl isobutyl ketone. Examples of suitable amides are dimethyl formamide, dimethyl acetamide, N-methyl pyrrolidone and γ-butyrolactone. There are no specific limitations to these solvents inasmuch as the solvent is effective for carrying out a smooth and uniform reaction.

In addition, an acid or base may be added as a catalyst to promote the reaction in the preparation of component B. Examples of suitable acids are: inorganic acids such as hydrochloric acid, nitric acid, sulfuric acid and phosphoric acid; organic acids such as methane sulfonic acid, toluene sulfonic acid, phthalic acid, malonic acid, formic acid, acetic acid and oxalic acid; unsaturated organic acids such as methacrylic acid, acrylic acid, an itaconic acid; and ammonium salts such as tetramethylammonium hydrochloride and tetrabutylammonium hydrochloride. Of these acids, organic acids and unsaturated organic acids are particularly preferred. Examples of suitable bases are: aqueous ammonia; primary, secondary, or tertiary amines such as diethylamine, triethylamine, dibutylamine and cyclohexylamine; aromatic amines such as pyridine, alkali metal hydroxides such as sodium hydroxide or potassium hydroxide; and tertiary ammonium hydroxides such as tetramethyl ammonium hydroxide, quaternary ammonium hydroxide. Of these bases, tertiary amines and quaternary ammonium hydroxides are particularly preferred. The amounts of these acids or bases used is from 0.001 parts by weight to 1.0 part by weight, preferably from 0.01 parts by weight to 0.1 parts by weight, for 100 parts by weights of alkoxysilane compounds.

Component (C)

The silicone polymer which is used as component C of the present invention is preferably a graft copolymer having silicone in the side chain, and more preferably an acrylic graft copolymer having silicone in the side chain.

As the silicone-containing graft copolymers are prepared by a radical polymerization of an acryl-modified silicone high polymeric monomer and a acryl modified silicone; and radically polymerizable monomer, the products obtained by the condensation of a silicone compound of the formula (3), and an acryl compound of the formula (4) can be used.

(3)

wherein $R^6$ and $R^7$ are monovalent aliphatic hydrocarbon groups containing 1–10 carbon atoms, phenyl groups, or monovalent halogen-containing hydrocarbon groups and q is a positive number of 1 or more.

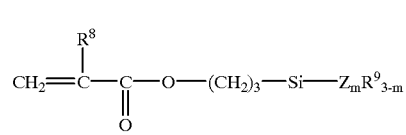
(4)

wherein $R^8$ is a hydrogen atom or a methyl group; $R^9$ represents a methyl group, ethyl group, or phenyl group, with two or more of $R^9$ being either the same or different; and Z is a chlorine atom, methoxy group, or ethoxy group; and m is 1, 2 or 3.

The acryl modified silicone compound can be copolymerized with a radically polymerisable monomer such as for example methylmethacrylate, butylacrylate, styrene and other monofunctional monomers listed below.

The silicone compounds of the formula (3) are commercially available. In the above formula (3), $R^6$ and $R^7$ are monovalent aliphatic hydrocarbon groups containing 1–10 carbon atoms, phenyl groups, or monovalent halogen-containing hydrocarbon groups. Examples of the monovalent aliphatic hydrocarbon groups containing 1–10 carbon atoms are methyl group, ethyl group and acyl group; examples of the monovalent halogen-containing hydrocarbon groups are 3,3,3-trifluoropropyl group, 4,4,4-trifluoro-3,3-difluorobutyl group and 2-chloroethyl group. Methyl group is particularly preferred as $R^8$ and $R^9$. In the above formula (3), q is a positive number of one or more. An oily copolymer tends to be obtained from an acryl-modified silicone induced from silicone with a high molecular weight with the number q of 100 or more and a radically polymerizable monomer. When an acryl-modified silicone induced from silicone with a low molecular weight with the number q of less than 100 and a radically polymerizable monomer are copolymerized, the resulting copolymer may be an oil, jelly, or solid.

These acrylsilane compounds can be easily obtained by reacting a silicon compound with a compound having aliphatic multiple bonds in the presence of a chloroplatinic acid according to the method disclosed by Japanese Patent Publication No. 9969/1958.

Examples of acrylsilane compounds of the formula (4) are γ-methacryloxypropyl-dimethylchlorosilane, γ-methacryloxypropyl-dimethylethoxysilane, γ-methacryloxypropyl-diphenylchlorosilane, γ-acryloxypropyl-dimethylchlorosilane, γ-methacryloxypropyl-triethoxysilane and γ-methacryloxypropyl-trichlorosilane.

The radical copolymerization of the acryl-modified silicone and the radically polymerizable monomer can be carried out using a conventionally known method, such as radical polymerization using e.g. a peroxy or persulphate compound as initiator or a method of using an irradiation sensitive initiator. When the copolymerization is carried out using ultraviolet radiation, a photosensitizer known in the art can be used as the initiator for the radical polymerisation. When electron beam is used, an initiator is not necessary.

The silicone copolymer thus obtained is a comb-like graft copolymer with the radical polymerized monomer as a trunk and silicone as branches.

Preferably, the silicone polymer (c) contains 10–70 wt. % of SiO units. More preferably, the polymer contains 20–90 wt. % of $SiOR^6R^7$ groups as defined in formula (3).

Cymac US-150, US-270, US-350, US-450 and Reseda GP-700 (manufactured by Toagosei Co., Ltd.) are examples of commercially available products of the silicone copolymer.

Component (D)

Component D of the present invention is any radiation sensitive initiator (photo-initiator) capable of producing radicals by irradiation and initiating the polymerization. A photosensitizer can be used together with the photo-initiator as required. The term "radiation" as used here includes infrared light, visible light, ultraviolet light, deep ultraviolet light, X-rays, electron beam, α-rays, β-rays, γ-rays and the like.

Preferably, the composition of the present invention is cured using visible light, UV light, deep UV light, or a combination thereof. Examples of the above-mentioned irradiation sensitive initiators are acetophenone, acetophenone benzyl ketal, anthraquinone, 1-hydroxycyclohexyl phenyl ketone, 2,2-dimethoxy-2-phenylacetophenone, xanthone compounds, triphenylamine, carbazole, 3-methylacetophenone, 4-chlorobenzophenone, 4,4'-dimethoxybenzophenone, 4,4'-diaminobenzophenone, 2-hydroxy-2-methyl-1-phenylpropan-1-one, 1-(4-isopropylphenyl)-2-hydroxy-2-methylpropan-1-one, carbazole, xanthone, 1,1-dimethoxydeoxybenzoin, 3,3'-dimethyl-4-methoxybenzophenone, thioxanethone compounds, diethylthioxanthone, 2-isopropylthioxanthone, 2-chlorothioxanthone, 1-(4-dodecylphenyl)-2-hydroxy-2-methylpropan-1-one, 2-methyl-1-4-(methylthio)phenyl-2-morpholino-propan-1-one, triphenylamine, 2,4,6-trimethylbenzoyl diphenylphosphine oxides, bis-(2,6-dimethoxybenzoyl)-2,4,4-trimethylpentylphosphine oxides, bisacylphosphine oxide, benzyl methyl ketal, 1-hydroxycyclohexyl phenyl ketone, 2-hydroxy-2-methyl-1-phenylpropan-1-one, fluorenone, fluorene, benzaldehyde, benzoin ethyl ether, benzoin propyl ether, benzophenone, Michler's ketone, 2-benzyl-2-dimethylamino-1-(4-morpholinophenyl)-butan-1-one, 3-methylacetophenone, 3,3',4,4'-tetra(t-butylperoxycarbonyl)benzophenone (BTTB) and a combination of BTTB and a coloring photosensitizer such as xanthene, thioxanthene, cumarin, or ketocumarin.

Of these, particularly preferred are benzyl methyl ketal, 1-hydroxycyclohexyl phenyl ketone, 2,4,6-trimethylbenzoyl diphenylphosphine oxide, bis-(2,6-dimethoxybenzoyl)-2,4,4-trimethylpentyl phosphine oxide and 2-benzyl-2-dimethylamino-l-(4-morpholinophenyl)-butan-1-one.

Commercially available irradiation sensitive initiators (photo-initiators) include, Irgacure 184, 651, 500, 907, 369, 784, 2959 (manufactured by Ciba Geigy), Lucirine TPO (manufactured by BASF), Darocure 1116, 1173 (manufactured by Merck), Ubecryl P36 (manufactured by UCB), Escacure KIP150 and Escacure KIP100F (manufactured by Lamberti).

Examples of photosensitizers include triethylamine, diethylamine, N-methyldiethanolamine, ethanolamine, 4-dimethylaminobenzoic acid, 4-methyl dimethylaminobenzoate, 4-ethyl dimethylaminobenzoate, 4-isoamyl dimethylaminobenzoate and commercially available products such as Ubecryl P102, 103, 104, 105 (manufactured by UCB).

The proportion of component D present is usually 0.01–10 wt. %, preferably 0.5–7 wt. %, and particularly preferably 1–5 wt. %, of the total amount of the composition.

When this proportion is 10 wt. % or more, storage stability of the composition and properties of the cured products are impaired. If less than 0.01 wt. %, the cure rate may be retarded.

The compositions of the present invention preferably contain 4.9–59.9 wt. % of component A; 40–95 wt. % of component B; 0.1–20 wt. % of component C; and 0.01–10 wt. % of component D.

Component (E)

Component E is a polymerizable monomer containing avinyl group or (meth)acryloyl group other than the above-mentioned component A and can be used as an optional component in the present invention. The polymerizable monomer may be either a mono-functional monomer or a poly-functional monomer.

Examples of the mono-functional monomer are vinyl group containing monomers such as N-vinyl caprolactam, N-vinyl pyrrolidone, N-vinylcarbazole and vinyl pyridine; acrylamide, acryloyl morpholine, 7-amino-3,7-dimethyloctyl (meth)acrylate, isobutoxymethyl (meth) acrylamide, isobornyloxyethyl (meth)acrylate, isobornyl (meth)acrylate, 2-ethylhexyl (meth)acrylate, ethyldiethylene glycol (meth)acrylate, t-octyl (meth)acrylamide, diacetone (meth)acrylamide, dimethylaminoethyl (meth)acrylate, diethylaminoethyl (meth)acrylate, lauryl (meth)acrylate, dicyclopentadiene (meth)acrylate, dicyclopentenyloxyethyl (meth)acrylate, dicyclopentenyl (meth)acrylate, N,N-dimethyl (meth)acrylamide tetrachlorophenyl (meth)acrylate, 2-tetrachlorophenoxyethyl (meth)acrylate, tetrahydrofurfuryl (meth)acrylate, tetrabromophenyl (meth)acrylate, 2-tetrabromophenoxyethyl (meth)acrylate, 2-trichlorophenoxyethyl (meth)acrylate, tribromophenyl (meth)acrylate, 2-tribromophenoxyethyl (meth)acrylate, 2-hydroxyethyl (meth)acrylate, 2-hydroxypropyl (meth)acrylate, phenoxyethyl (meth)acrylate, butoxyethyl (meth)acrylate, pentachlorophenyl (meth)acrylate, pentabromophenyl (meth)acrylate, polyethylene glycol mono(meth)acrylate, polypropylene glycol mono(meth)acrylate, bornyl (meth)acrylate and methyltriethylene diglycol (meth)acrylate. Of these, N-vinyl caprolactam, N-vinyl pyrrolidone, acryloyl morpholine, N-vinylcarbazole, isobornyl (meth)acrylate, phenoxyethyl (meth)acrylate and the like are preferred, with N-vinyl caprolactam, N-vinyl pyrrolidone and acryloyl morpholine are particularly preferred. Acryloyl morpholine is an ideal mono-functional monomer.

Commercially available mono-functional monomers include, Aronix M-111, M-113, M-117 (manufactured by Toagosei Co., Ltd.), Kayarad TC110S, R-629, R-644 (manufactured by Nippon Kayaku Co., Ltd.) and Viscoat 3700 (manufactured by Osaka Organic Chemical Industry, Ltd.).

Examples of poly-functional monomers are (meth)acryloyl group-containing monomers such as ethylene glycol di(meth)acrylate, dicyclopentenyl di(meth)acrylate, triethylene glycol diacrylate, tetraethylene glycol di(meth)acrylate, tricyclodecanediyldimethylene di(meth)acrylate, tripropylene diacrylate, neopentyl glycol di(meth)acrylate, both terminal (meth)acrylate of ethylene oxide addition bisphenol A, both terminal (meth)acrylate of propylene oxide addition bisphenol A, both terminal (meth)acrylate of ethylene oxide addition tetrabromobisphenol A, both terminal (meth)acrylate of propylene oxide addition tetrabromo bisphenol A, both terminal (meth)acrylic acid adduct of bisphenol A diglycidyl ether, both terminal (meth)acrylic acid adduct of tetrabromo bisphenol A diglycidyl ether, 1,4-butanediol di(meth)acrylate, 1,6-hexanediol di(meth)acrylate and polyethylene glycol di(meth)acrylate.

Of these, both terminal (meth)acrylate of ethylene oxide addition bisphenol A, both terminal (meth)acrylate of propylene oxide addition bisphenol A, tricyclodecanediyldimethylene di(meth)acrylate, tetraethylene glycol di(meth)acrylate, tripropylene glycol di(meth)acrylate, neopentyl glycol di(meth)acrylate and polyethylene glycol di(meth)acrylate are particularly desirable.

Examples of commercially available poly-functional monomers are Yupimer UV, SA1002 (manufactured by Mitsubishi Chemical Corp.), Viscoat 700 (manufactured by Osaka Organic Chemical Industry Co., Ltd.), Kayarad R-604 (manufactured by Nippon Kayaku Co., Ltd.) and Aronix M-210 (manufactured by Toagosei Co., Ltd.).

Additives

In addition to the above components, various additives may be added to the composition of the present invention as required. Such additives include antioxidants, UV absorbers, photostabilizers, silane coupling agents, anti-aging agents, thermal polymerization inhibitors, colorants, leveling agents, surfactants, preservatives, plasticizers, lubricants, solvents, inorganic fillers, organic fillers, wettability improvers and coating surface improvers.

Commercially available antioxidants include Irganox 1010, 1035, 1076, 1222 (manufactured by Ciba Geigy); UV absorbers include, Tinuvin P, 234, 320, 326, 327, 328, 213, 400 (manufactured by Ciba Geigy) and Sumisorb 110, 130, 140, 220, 250, 300, 320, 340, 350, 400 (manufactured by Sumitomo Chemical Industries Co., Ltd.); and photostabilizers include, Tinuvin 292, 144, 622LD (manufactured by Ciba Geigy) and Sanol LS-770, 765, 292, 2626, 1114, 744 (manufactured by Sankyo Chemical Co.). Examples of silane coupling agents include γ-aminopropyltriethoxysilane, γ-mercaptopropyltrimethoxysilane and γ-methacryloxy-propyltrimethoxysilane and products such as SH6062 and SZ6030 (manufactured by Toray-Dow Corning Silicone Co., Ltd.), KBE903, KBM803 (manufactured by Shin-Etsu Silicone Co., Ltd.). Commercially available aging preventives include, Antigene W, S, P, 3C, 6C, RD-G, FR and AW (manufactured by Sumitomo Chemical Industries Co., Ltd.) and the like.

Moreover, polymers or oligomers can be incorporated into the composition of the present invention as other additives. Other additives include epoxy resin, polymerizable compounds such as urethane (meth)acrylate, vinyl ether, propenyl ether and maleic acid derivatives; polyamide, polyimide, polyamideimide, polyurethane, polybutadiene, chloroprene, polyether, polyester, pentadiene derivatives, styrene/butadiene/styrene block copolymer, styrene/ethylene/butene/styrene block copolymer, styrene/isoprene/styrene block copolymer, petroleum resin, xylene resin, ketone resin, fluorine-containing oligomer, silicon-containing oligomer and polysulfide- type oligomer.

Cured products with a pencil hardness of H to 9H at 23° C. can be obtained by curing the radiation curable resin composition of the present invention. The cure shrink rate accompanied by curing is usually 10% or less and preferably 6% or less. In addition, resulting cured products have superior mar and alkali resistance.

The alkali resistance is preferably such, that the coating when placed in a 5 wt. % NaOH aqueous solution at 45° C. in a thermostat for 1 hour (preferably for 3 hours), shows no remarkable defects in adhesion, nor in external appearance.

EXAMPLES

The present invention is explained in more detail by way of examples, which are not intended to limit the invention.

Preparation of Alkoxysilane Compound

Reference Example 1

In dry air, 20.6 parts by weight of isophorone diisocyanate was added dropwise to a solution of 7.8 parts by weight of mercaptopropyltrimethoxysilane and 0.2 part by weight of dibutyl tin dilaurate over one hour while stirring at 50° C. The mixture was further stirred for 3 hours at 60° C. After the addition of 71.4 parts by weight of pentaerythritol triacrylate dropwise over one hour at 30° C., the mixture was stirred for 3 hours at 60° C. to obtain an alkoxysilane compound. This compound is called Silane Compound A. The amount of remaining isocyanate in this product was analyzed to find that the content was less than 0.1%, indicating that the reaction has almost completed.

Preparation of Component B

A mixture of 8.1 parts by weight of Silane Compound A prepared in the Reference Example 1, 90.5 parts by weight of methanol silica sol MEK-ST (manufactured by Nissan Chemical Industries, Ltd., a dispersion of colloidal silica methyl ethyl ketone (average particle diameter 0.01–0.02 μm), silica content 30%) and 0.1 part by weight of ion exchanged water was stirred at 60° C. for 3 hours. 1.3 parts by weight of ortho-methyl formate was added and the mixture was further stirred for one hour while heating at the same temperature to obtain a colorless and transparent dispersion liquid. The liquid is herein called Dispersion Liquid 1a.

Preparation of Compositions

The method for preparing the compositions used in the present invention is explained by the weight percent of each component used as shown in Table 1.

Example 1

To a UV shielded vessel were added 71 wt. % of the Dispersion Liquid 1a prepared in the Reference Example 2, 20 wt. % of dipentaerythritol hexacrylate, 3 wt. % of 1-hydroxycyclohexylphenyl ketone and 1 wt. % of Cymac US-150. The mixture was stirred for 30 minutes at room temperature to obtain Example Composition 1 as a homogeneous solution. Examples 2 to 4 and comparative examples 1–4, also shown in Table 1, were prepared in the same manner.

Test Examples

Test specimens of the resin composition of the present invention were prepared and evaluated for pencil hardness, mar resistance, abrasion resistance and alkali resistance.

Preparation of Test Specimens:

The resin compositions obtained in Examples and Comparative Examples were applied to a commercially available PET film (film thickness 188 μm) to a thickness of about 5 pm using a wire bar coater (No. 10) and allowed to stand in an infrared drying furnace at 40° C. for one minute, followed by irradiation with ultraviolet light at a dose of 0.3 J/cm² in the air to obtain cured films. The films were maintained at a temperature of 23° C. and relative humidity of 50% for 24 hours to obtain test specimens.

Measurement of Pencil Hardness:

The pencil hardness of the test specimens was measured using a pencil scratch test machine in accordance with JIS K5400.

Scratch Resistance Test:

The test specimens were placed on a vibration abrasion testing machine and reciprocated 10 times, while putting a load of 200 g on a steel wool #0000. Conditions of scratch were evaluated by naked eye observation.

Evaluation standards applied are described below:

◎: There was no scratch at all;
○: 1–3 scratches were produced;
Δ: 4–10 scratches were produced;
X: More than 10 scratches were produced.

Abrasion Resistance Test:

The taber test according to JIS R3221 was carried out using a taber abrasion tester (an abrasion ring CS-10F, taber load 500 g, 100 rotation) to measure ΔH (haze) value of above the test specimens.

Substrate Adhesion:

The method of JIS K5400 was followed for the measurement of the substrate adhesion. Specifically, 100 squares were produced on the surface of cured test specimens by 11×11 cut lines. A commercially available cellophane tape was adhered to the surface, followed by rapid removal. The number (X) of squares not peeled off were counted. The substrate adhesion is indicated by X/100.

External Appearance:

Defects on the surface, such as cracks, whitening and clouding, were observed by the naked eye to evaluate according to the following standard. The evaluation standards applied are described below:

○: No remarkable defects were seen;
Δ: Small cracks and slight cloud were observed;
X: External appearance was conspicuously damaged.

Alkali Resistance Test:

The above-mentioned test specimens were placed in a 5 wt. % NaOH aqueous solution which was maintained at 45° C. in a thermostat and allowed to stand for 3 hours. Adhesion of the cured resin products were evaluated.

TABLE 1

| Component | EXAMPLE | | | | COMPARATIVE EXAMPLE | | | |
|---|---|---|---|---|---|---|---|---|
| | 1 | 2 | 3 | 4 | 1 | 2 | 3 | 4 |
| Component B | | | | | | | | |
| Dispersion Liquid 1a | 71 | 71 | 71 | 71 | 71 | 71 | 71 | 71 |
| Component A | | | | | | | | |
| DPHA[1] | 20 | 20 | | | 20 | 20 | 20 | |
| TMPTA[2] | | | 20 | 20 | | | | 20 |
| IBXA[3] | 5 | 5 | 5 | 5 | 5 | 5 | 5 | 5 |
| Component D | | | | | | | | |
| Irradiation sensitive initiator[4] | 3 | 3 | 3 | 3 | 3 | 3 | 3 | 3 |
| Component C | | | | | | | | |
| Cymac US-150[5] | 1 | | 1 | | | | | |
| Cymac US-150[6] | | 1 | | 1 | | | | |
| SH28PA[7] | | | | | 1 | | | |
| SH200[8] | | | | | | 1 | | |
| Silaplene FM-0711[9] | | | | | | | 1 | |

[1] Dipentaerythritol hexacrylate;
[2] Pentaerythritol triacrylate;
[3] Isobornyl acrylate;
[4] 1-Hydroxycyclohexylphenyl ketone;
[5] Manufactured by Toagosei Co., Ltd.;
[6] Manufactured by Toagosei Co., Ltd.;
[7] Non-reactive (silicone oil) additive for anti-abrasion, Manufactured by Toray-Dow Corning Silicone Co., Ltd.;
[8] Non-reactive methyl substituted polysiloxane (silicone oil), Manufactured by Toray-Dow Corning Silicone Co., Ltd.;
[9] Methacrylate-reactive methyl substituted polysiloxane (silicone oil) with a Mw of about 1000, Chisso Corp.

TABLE 2

| | EXAMPLE | | | | COMPARATIVE EXAMPLE | | | |
|---|---|---|---|---|---|---|---|---|
| | 1 | 2 | 3 | 4 | 1 | 2 | 3 | 4 |
| Pencil hardness | 9H | 9H | 7H | 7H | 8H | 9H | 9H | 7H |
| Scratch resistance | ◎ | ◎ | ◎ | ◎ | ○ | ◎ | ◎ | Δ |
| Abrasion resistance (ΔH) | 2 | 2 | 6 | 6 | 3 | 2 | 2 | 10 |
| Substrate adhesion | 100 | 100 | 100 | 100 | 100 | 100 | 100 | 100 |
| External appearance | ○ | ○ | ○ | ○ | ○ | ○ | X | Δ |
| Alkali resistance | | | | | | | | |
| After substrate adhesion test | 100 | 100 | 100 | 100 | 90 | 0 | 100 | 50 |
| After External appearance test | ○ | ○ | ○ | ○ | ○ | X | X | X |

The radiation curable resin composition of the present invention provides surfaces of plastic molded articles and coated materials with superior slip characteristics and improved resistance to abrasions, stains, weather, solvent and alkali environments. The composition is particularly suitable as a hard coat material for plastic optical components, touch panels, film-type liquid crystal elements, molded plastic articles, or as a stain-proof or scratch-proof coating for wall and flooring materials which are used as architectural interior finishings.

What is claimed is:

1. A liquid curable resin composition comprising:
   (A) a polyfunctional (meth)acrylic compound having at least three (meth)acryloyl groups;
   (B) a mixture of
       i) an alkoxysilane compound comprising at least one organic group represented by the following formula (1),

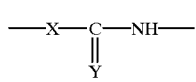

wherein
       X represents a sulfur atom,
       Y is an oxygen atom or a sulfur atom, and
       ii) silica particles; and
   (C) a silicone polymer.

2. The composition according to claim 14 wherein for component (B), the amount of the alkoxysilane compound immobilized on the silica particles is more than about 0.01 wt. %.

3. The composition according to claim 14, wherein for component (B), the silica particles have an average particle diameter of 0.001 μm–20 μm.

4. The composition according to claim 15 wherein the silicone polymer (C) is a graft copolymer, having silicone in the side chain.

5. The composition according to claim 4, wherein the silicone polymer (C) is an acrylic graft copolymer.

6. The composition according to claim 4 wherein the silicone polymer (C) contains 10–70 wt. % of SiO units.

7. The composition according to claim 4 wherein the silicone polymer contains 20–90 wt. % of $SiOR^6R^7$ groups as defined by formula (3):

wherein
   $R^6$ and $R^7$ represent a monovalent aliphatic hydrocarbon containing 1–10 carbon atoms, phenyl groups, or monovalent halogen-containing hydrocarbon C-groups and
   q represents a number of 1 or more.

8. The composition according to claim 14 wherein the composition further comprises a polymerizable monomer comprising a vinyl or (meth)acryloyl group other than that of component (A).

9. The composition according to claim 14 wherein the composition comprises, relative to the total composition:
   (i) 49–59.9 wt. % of component A;
   (ii) 40–95 wt. % of component B; and
   (iii) 0.1–20 wt. % of component C.

10. A cured coating according to any one of claims 2–9 and 14, obtained by irradiation with UV or visible light, wherein said cured coating is cured on a substrate.

11. The coating according to claim 10, wherein the coating has a pencil hardness of H to 9H at 23° C.

12. The coating according to claim 10, wherein the coating is resistant to alkali for 1 hour at 45° C. in a 5 wt. % NaOH aqueous solution.

13. The coating according to claim 10, wherein the coating is resistant to alkali for 3 hours at 45° C. in a 5 wt. % NaOH aqueous solution.

* * * * *

UNITED STATES PATENT AND TRADEMARK OFFICE
CERTIFICATE OF CORRECTION

PATENT NO. : 6,013,749
DATED : January 11 2000
INVENTOR(S) : BABA et al.

It is certified that error appears in the above-identified patent and that said Letters Patent is hereby corrected as shown below:

ON THE FACE OF THE PATENT

Please change: "[73] Assignee: DSM N.V., Heerlen, Netherlands"

to

--[73] Assignee: DSM N.V., Heerlen, Netherlands; JSR CORPORATION and

Japan Fine Coatings Co., Ltd., both of Tokyo, Japan--

Signed and Sealed this

Twenty-second Day of August, 2000

*Attest:*

Q. TODD DICKINSON

*Attesting Officer*     *Director of Patents and Trademarks*